(12) United States Patent
Hoshino et al.

(10) Patent No.: US 7,388,627 B2
(45) Date of Patent: Jun. 17, 2008

(54) DISCRIMINATION MEDIUM AND ARTICLE TO BE DISCRIMINATED

(75) Inventors: Hidekazu Hoshino, Yokohama (JP); Itsuo Takeuchi, Yokohama (JP); Masatake Ono, Yokohama (JP); Mutsumi Sasaki, Yokohama (JP); Tohru Ida, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 208 days.

(21) Appl. No.: 10/577,075

(22) PCT Filed: Oct. 27, 2004

(86) PCT No.: PCT/JP2004/015910

§ 371 (c)(1),
(2), (4) Date: Apr. 25, 2006

(87) PCT Pub. No.: WO2005/043493

PCT Pub. Date: May 12, 2005

(65) Prior Publication Data
US 2007/0077404 A1    Apr. 5, 2007

(30) Foreign Application Priority Data
Oct. 31, 2003  (JP) .............................. 2003-373341

(51) Int. Cl.
*G02F 1/1335* (2006.01)
*G03H 1/00* (2006.01)
*G06K 9/74* (2006.01)
*B32B 9/04* (2006.01)

(52) U.S. Cl. .......................... 349/96; 349/98; 349/115; 359/2; 356/71; 428/411.1

(58) Field of Classification Search .................. 349/1, 349/96, 98, 115, 175, 195, 185; 359/1, 2, 359/15, 34; 356/71; 428/212, 411.1
See application file for complete search history.

(56) References Cited

U.S. PATENT DOCUMENTS 5,770,283 A   6/1998 Gosselin et al.

(Continued)

FOREIGN PATENT DOCUMENTS

CN   1287632 A   3/2001

(Continued)

*Primary Examiner*—Brian M Healy
(74) *Attorney, Agent, or Firm*—Oliff & Berridge, PLC

(57) ABSTRACT

A breakable seal can be discriminated more easily than the conventional one. The discrimination medium 100 has a cholesteric liquid crystal layer 104, a substrate layer 105, an adhesive layer 102, and a partial peeling layer 103. The discrimination medium 100 has an adhesion strength $X_A$ between the adhesive layer 102 and the partial peeling layer 103, an adhesion strength $X_B$ between the partial peeling layer 103 and the cholesteric liquid crystal layer 104, and an adhesion strength $X_C$ between the cholesteric liquid crystal layer 104 and the substrate layer 105. The relationships $X_A < X_B$ and $X_A < X_C$ are satisfied at areas 106, 108, and 110. The relationships $X_C < X_A$ and $X_C < X_B$ are satisfied at areas 107 and 109. In the above manner, when the discrimination medium 100 is peeled from the article 101, the discrimination medium 100 is separated into a discrimination medium 116 and a discrimination medium 117. For example, the above cholesteric liquid crystal layer is provided to a breakable seal, so that the breakable seal which allows confirmation of whether or not the discrimination medium is authentic before the breakable seal is broken and which allows confirmation of breakage of he breakable seal when the breakable seal is broken is provided.

24 Claims, 5 Drawing Sheets

U.S. PATENT DOCUMENTS

| | | | |
|---|---|---|---|
| 6,061,122 A | 5/2000 | Hoshino et al. | |
| 6,628,432 B1 | 9/2003 | Oshima et al. | |
| 6,661,487 B2 * | 12/2003 | Takahashi et al. | 349/115 |
| 7,126,754 B2 * | 10/2006 | Yamaoka et al. | 359/485 |
| 7,201,821 B2 * | 4/2007 | Hoshino et al. | 156/277 |
| 2002/0196397 A1 * | 12/2002 | Takahashi et al. | 349/115 |
| 2007/0077404 A1 * | 4/2007 | Hoshino et al. | 428/212 |
| 2007/0081144 A1 * | 4/2007 | Hoshino et al. | 356/71 |
| 2007/0097471 A1 * | 5/2007 | Watanabe et al. | 359/15 |
| 2007/0159671 A1 * | 7/2007 | Hoshino et al. | 359/2 |

FOREIGN PATENT DOCUMENTS

| | | |
|---|---|---|
| JP | A 07-146650 | 6/1995 |
| JP | A 07-234636 | 9/1995 |
| JP | A 08-095491 | 4/1996 |
| JP | A 08-221676 | 8/1996 |
| JP | A 09-277423 | 10/1997 |
| JP | A 10-105065 | 4/1998 |
| JP | A 11-151877 | 6/1999 |
| JP | A 2003-084672 | 3/2003 |
| JP | A 2003-261840 | 9/2003 |

* cited by examiner random light (natural light)

right-handed circularly polarized light having predetermined wavelength left-handed circularly polarized light,
right-handed circularly polarized light having wavelength other than predetermined wavelength,
linearly polarized light reflection light reflected light (interference)

A layer
B layer transmission light

DISCRIMINATION MEDIUM AND ARTICLE TO BE DISCRIMINATED

TECHNICAL FIELD

The present invention relates to a technique which may be advantageously used for breakable seals, which allows determination of whether or not a seal has been broken.

BACKGROUND ART

Techniques have been known in which a seal is applied to an opening portion in order for traces to remain when unsealing a package of goods, and if the seal is broken once, it can be determined whether or not the seal has been broken. This seal is called a breakable seal. In a breakable seal, breakage of the breakable seal can be discriminated by optical changes thereof, that is, changes in appearance thereof.

A transferable seal and a nontransferable seal may be used as the breakable seal. In the transferable seal, when the transferable seal, which has been applied to an article, is forcibly peeled from the article, a portion of the transferable seal remains on the article. In the transferable seal, since traces by peeling the transferable seal from the article are generated on the article on which the transferable seal has been applied, it can be determined whether or not breaking of the transferable seal was performed. The transferable seal is disclosed in Patent Publications 1 and 2.

Although the non-transferable seal can be peeled from an article to which the nontransferable seal has been applied, traces by peeling the nontransferable seal from the article are generated on the article. When the nontransferable seal which was peeled therefrom is applied to the article again, it can be discriminated that the nontransferable seal which was peeled therefrom was applied to the article again. The nontransferable seal is disclosed in Patent Publications 3 to 5.

The Patent Publication 1 is Japanese Unexamined Patent Application Publication No. Hei 9-277423. The Patent Publication 2 is Japanese Unexamined Patent Application Publication No. Hei 8-95491. The Patent Publication 3 is Japanese Unexamined Patent Application Publication No. 2003-261840. The Patent Publication 4 is Japanese Unexamined Patent Application Publication No. 2003-84672. The Patent Publication 5 is Japanese Unexamined Patent Application Publication No. Hei 7-234636.

DISCLOSURE OF THE INVENTION

Problems Solved by the Invention

However, since the breakable seals which can indicate breakage thereof have the same function as typical seals, the breakable seals may be easily falsified. Although the breakable seals are reliable in confirming breakage of the breakable seals, it cannot be confirmed whether or not the article to which the breakable seal is applied is authentic until the breakable seal is broken. Due to this, when a counterfeit product having the same appearance as an authentic product is produced, and the counterfeit product has an authentic breakable seal, in practice, the counterfeit product may not be discriminated from the authentic product until the counterfeit product is unsealed.

Therefore, an object of the present invention is to provide a breakable seal having a technique of fabrication prevention by using a discrimination medium of which breakage of a seal can be confirmed and can show the authenticity thereof before the discrimination medium is broken.

Means for Solving the Problems

According to one aspect of the present invention, a discrimination medium includes: an optical functional layer including at least one of a cholesteric liquid crystal layer having a circular polarization light selectivity of reflecting predetermined circularly polarized light, and a multilayer film having plural light transparent films which are laminated and are different from each other in refraction index; an adhesive layer; a partial peeling layer having a first surface and a second surface, the first surface directly or indirectly contacting the adhesive layer, the second surface directly or indirectly contacting the optical functional layer; and a structure which is provided at a portion of the second surface and of which a portion is easily peeled from the optical functional layer.

In the above aspect of the present invention, for example, when the discrimination medium is peeled from an article on which the discrimination medium is applied, a portion of the partial peeling layer is adhered to the adhesive layer and remains on an applying surface of the article. Another portion of the peeling layer is peeled from the article. In this case, a portion of the optical functional layer remains on an applying surface of the article in accordance with the peeling of the partial peeling layer. Another portion of the optical functional layer remains on the discrimination medium which is peeled from the article.

As a result, a portion of the optical functional layer of the discrimination medium peeled from the article is lost, and the discrimination medium peeled from the article is different from the discrimination medium before it is peeled from the article in visibility. On the other hand, another portion of the optical functional layer remains on the discrimination medium remaining on the article, and the discrimination medium remaining on the article is different from the discrimination medium before it is peeled from the article in visibility. The discrimination can function as a breakable seal by the above difference in visibility. Since this function is obtained by using at least one of the cholesteric liquid crystal layer and the multilayer film having plural light transparent films which are laminated and are different from each other in refraction index, the discrimination can be easily discriminated.

The authenticity of the discrimination medium as a breakable seal which is applied to the article can be easily determined by using optical characteristics exhibited by at least one of the cholesteric liquid crystal layer and the multilayer film having plural light transparent films which are laminated and are different from each other in refraction index. Since the optical characteristics exhibited by at least one of the cholesteric liquid crystal layer and the multilayer film are difficult to reproduce unless design conditions thereof are known, falsification of the discrimination medium can be reliably prevented.

In the above aspect of the present invention, when the discrimination medium is completely peeled from the applying surface, peeling and breaking occurs at a portion of a surface of the partial peeling layer proximate to the optical functional layer by at least one of a pressure and a stress applied to the discrimination medium, so that optical characteristics exhibited by the optical functional layer are partially changed. Since this change can be seen with the eye, peeling of the discrimination medium from the article can be recognized.

In another aspect of the present invention, a discrimination medium includes: an optical functional layer including at least one of a cholesteric liquid crystal layer having a circular polarization light selectivity of reflecting predetermined circularly polarized light, and a multilayer film having plural light transparent films which are laminated and are different from each other in refraction index; a substrate layer provided on the optical functional layer; an adhesive layer; a partial peeling layer having a first surface and a second surface, the first surface directly or indirectly contacting the adhesive layer, the second surface directly or indirectly contacting the optical functional layer; an adhesion strength $X_A$ on the first surface of the partial peeling layer; an adhesion strength $X_B$ on the second surface of the partial peeling layer; and an adhesion strength $X_C$ between the optical functional layer and the substrate layer. The adhesion strength $X_A$, the adhesion strength $X_B$, and the adhesion strength $X_C$ satisfy the relationships $X_A < X_B$ and $X_A < X_C$ at a portion, and satisfy the relationships $X_C < X_A$ and $X_C < X_B$ at another portion.

In the above aspect of the present invention, when the discrimination medium is peeled from the article, the adhesion strength of the partial peeling layer proximate to the adhesive layer is the weakest at a portion of the discrimination medium, so that the partial peeling layer proximate to the adhesive layer at the portion of the discrimination medium is peeled at the beginning. As a result, the optical functional layer is peeled from the adhesive layer and remains on the substrate layer at the portion thereof. On the other hand, the optical functional layer is peeled from the substrate layer and remains on the adhesive layer at another portion of the discrimination medium. Therefore, losses of the optical functional layer are generated on each discrimination medium which is peeled from the article and which remains on the article. The losses may be seen by using the optical characteristics exhibited by the optical functional layer, so that the discrimination medium can be easily discriminated. As a result, the discrimination medium can have a high function as a breakable seal.

In the above aspect of the present invention, since the discrimination medium can be easily discriminated by using optical characteristics exhibited by at least one of the cholesteric liquid crystal layer having a circular polarization light selectivity and the multilayer film having plural light transparent films which are laminated and are different from each other in refraction index, the authenticity of the article can be determined by using the discrimination medium which is applied to the article.

That is, in the above aspect of the present invention, the discrimination medium can have a confirmation function having a security in confirming the unsealing of the article, and have a confirmation function for determining whether or not the article is authentic before the article is unsealed.

In another aspect of the present invention, a discrimination medium includes: an optical functional layer including at least one of a cholesteric liquid crystal layer having a circular polarization light selectivity of reflecting predetermined circularly polarized light, and a multilayer film having plural light transparent films which are laminated and are different from each other in refraction index; a substrate layer provided on the optical functional layer; an adhesive layer; a partial peeling layer having a first surface and a second surface, the first surface directly or indirectly contacting the adhesive layer, the second surface directly or indirectly contacting the optical functional layer; and a portion which is provided on the second surface of the peeling layer which has an adhesion strength weaker than that of another portion of the peeling layer. When a pressure or a stress is applied to the discrimination medium, the portion is selectively peeled, and a cavity is thereby formed thereat.

In the above aspect of the present invention, when the discrimination medium is peeled from the adhesive layer, the peeling or position shift of the peeling layer selectively occurs by a pressure or stress applied to the portion which has the weaker adhesion strength, so that the cavity is formed thereat, and a form formed by the cavity is recognized. Therefore, the discrimination can have a breakable seal function. The authenticity of the article can be determined by using the optical characteristics exhibited by the optical functional layer.

In a preferred embodiment of the present invention, a multilayer film may be provided between the adhesive layer and the partial peeling layer, and the multilayer film may have plural light transparent films which are laminated and are different from each other in refraction index. In this feature, since synergistic optical characteristics exhibited by the multilayer film can be obtained, the discrimination medium can be more easily discriminated.

In a preferred embodiment of the present invention, the discrimination medium further includes: a cut line provided at at least one of the respective layers by cutting. In this feature, when the discrimination medium is peeled from the article, the layer having the cut line is torn or shifted from the cut line, so that a peeled trace remains. The trace is superior in clearly appearing by optical characteristics exhibited by at least the cholesteric liquid crystal layer and the multilayer film. The cutting may be selected from the group consisting of cutting in which a cut line is formed at a portion of the layer or at the layer, cutting in which a dotted line, for example, perforations (or holes) are formed, and cutting in which a gap having a predetermined depth smaller than the length of the layer is formed at the layer.

An article may have the discrimination medium of the present invention, so that unsealing of an unsealed portion of the article can be discriminated and the authenticity of the article can be determined. The article may be one of various envelopes, boxes for packing goods, vessels, and packages in which goods are packed or provided. Alternatively, the article may be one of passports, documents, various cards, passes, bills, exchange tickets for money, bonds, security notes, gift certificates, pictures, tickets, public game voting tickets, recording media in which sound data and image data are recorded, recording media in which computer software is recorded, various products, and packages of the products.

Optical characteristics of a cholesteric liquid crystal layer will be explained. FIG. 5 is a conceptual diagram showing a structure of the cholesteric liquid crystal layer. The cholesteric liquid crystal has a layered structure. The molecular long axes of respective layers of the stacked structure are parallel to each other, and are parallel to the plane thereof. The respective layers are rotated slightly with respect to the adjacent layer and are stacked. The cholesteric liquid crystal thereby has a three-dimensional spiral structure.

Denoting that, in a direction perpendicular to the layer, pitch P is a distance needed when the molecular long axis is rotated through 360 degrees and returns to the initial state, and an average refraction index of the respective layers is index N, the cholesteric liquid crystal layer selectively reflects circularly polarized light having a center wavelength $\lambda s$ satisfying the equation $\lambda s = N \times P$. That is, when light (natural light) which is not predetermined circularly polarized light is irradiated on the cholesteric liquid crystal layer, the cholesteric liquid crystal layer selectively reflects circularly polarized light having a center wavelength λs. The polarization direction of the circularly polarized light reflected by the cholesteric liquid crystal layer is clockwise or counterclockwise depending on the rotation direction of the cholesteric liquid crystal layer. That is, circularly polarized light having the above predetermined center wavelength and the above predetermined circular polarization direction is selectively reflected by the cholesteric liquid crystal layer. Circularly polarized light having another wavelength and the above predetermined circular polarization direction, linearly polarized light, and circularly polarized light having circular polarization direction opposite to the above predetermined circular polarization direction passes through the cholesteric liquid crystal layer.

FIG. 6 is a conceptual diagram showing a condition in which light having a predetermined wavelength and a predetermined circular polarization direction is selectively reflected by a cholesteric liquid crystal layer 601. For example, FIG. 6 shows a cholesteric liquid crystal layer 601 having a spiral structure in which the molecular long axes of the respective layers are rotated in a clockwise direction (right-handed direction). When natural light enters to the cholesteric liquid crystal layer 601, right-handed circularly polarized light having the predetermined center wavelength is selectively reflected by the cholesteric liquid crystal layer 601. Another polarization light (linearly polarized light and left-handed circularly polarized light) and right-handed circularly polarized light having another center wavelength pass through the cholesteric liquid crystal layer 601.

For example, a cholesteric liquid crystal layer having a structure shown in FIG. 6 and reflecting light having a center wavelength λs of red light is disposed on a member such as a black sheet absorbing visible light. When random light such as sunlight is irradiated on the cholesteric liquid crystal layer, transmission light of the cholesteric liquid crystal layer is absorbed in the black sheet, and right-handed circularly polarized light having the predetermined center wavelength is selectively reflected by the cholesteric liquid crystal layer. As a result, the cholesteric liquid crystal layer is clearly seen to be red.

The above characteristic of selectively reflecting predetermined circularly polarized light having a predetermined center frequency is called circularly polarized light selectivity.

The color of the cholesteric liquid crystal changes depending on the viewing angle. When incident light obliquely enters into the cholesteric liquid crystal, the apparent pitch P decreases, and the center wavelength λs is thereby short. For example, reflection light reflected by the cholesteric liquid crystal is seen to be red at an angle perpendicular to the cholesteric liquid crystal. As the viewing angle is increased, the color of light shifts to orange, yellow, green, blue-green, and blue in turn. This phenomenon is called blue shift. The viewing angle is an angle of a visual line with respect to a line perpendicular to a viewing surface.

Optical characteristics of a multilayer film having plural light transparent films which are different from each other in refraction index will be explained. FIG. 7 is a conceptual diagram showing a condition in which the multilayer film reflects light. FIG. 7 shows one example in which films 701 (A layers) having a first refraction index and films 702 (B layers) having a second refraction index are alternately laminated.

When white light is irradiated on the multilayer film 703, incident light is reflected at the interfaces of the films different from each other in refraction index based on Fresnel's law. In this case, a portion of the incident light is reflected at the interface between the A layer and the B layer, and another portion of the incident light passes therethrough. Since each interface between the A layer and the B layer repeatedly exists, interferences between reflection light reflected at each interface occur. The larger the angle of the incident light, the shorter the optical path difference of the reflection light reflected by each interface. The interference of each light of the shorter wavelength occurs, and the intensity of the light of the shorter wavelength is thereby strong. Therefore, the more obliquely the multilayer film 703 on which white light is irradiated is viewed, that is, the more parallel to the plane of the multilayer film 703 the multilayer film 703 on which white light is irradiated is viewed, the shorter the wavelength of the light reflected strongly by the multilayer film 703. For example, the more oblique the multilayer film 703 on which white light is irradiated, the bluer the reflection light reflected by the multilayer film 703. This phenomenon is called blue shift. The incident angle is an angle between incident light and a line perpendicular to the incident surface.

In a preferred embodiment of the present invention, a hologram is formed on the cholesteric liquid crystal layer by stamping or embossing, and a predetermined figure of the hologram can be seen. A hologram may be formed on a surface of the multilayer film, on a reverse surface of the multilayer film, or in the multilayer film by printing, transferring, stamping, or embossing, and a figure of the hologram can be seen. When the figure is provided to the discrimination medium, visual effects can be obtained such that the figure is uniquely seen by the above optical characteristics. The figure may be a character, a logo, a graphic, a pattern, or one having a design producing visual effects for a viewer.

EFFECTS OF THE INVENTION

In the aspect of the present invention, a technique for prevention of falsification of a breakable seal can be improved by using the discrimination medium as a breakable seal, which allows confirmation of breakage of the discrimination medium and which allows confirmation of whether or not the discrimination medium is authentic before the discrimination medium is broken.

Figure 1A:
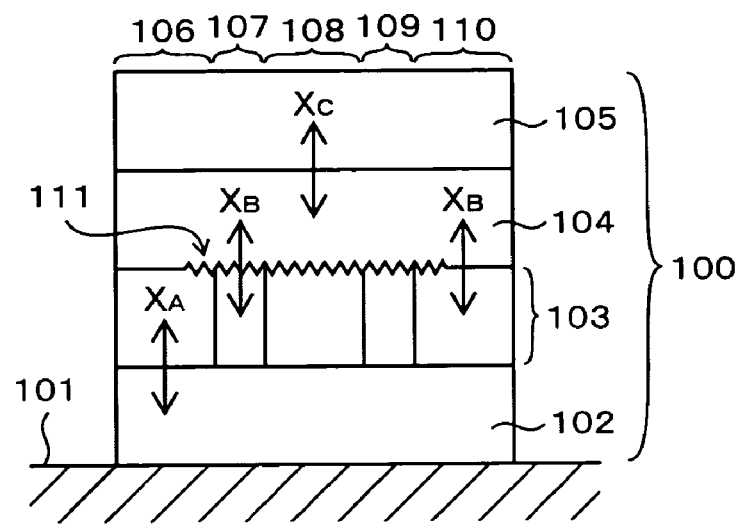
FIGS. 1A and 1B are cross sectional views showing a discrimination medium in cross section.

EXPLANATION OF REFERENCE NUMERALS 100 denotes a discrimination medium, 101 denotes an article to which the discrimination medium is applied, 102 denotes an adhesive layer, 103 denotes a partial peeling layer, 104 denotes a cholesteric liquid crystal layer, 105 denotes a substrate layer, 106 denotes an area of a portion, 107 denotes an area of another portion, 108 denotes an area of a portion, 109 denotes an area of another portion, 110 denotes an area of a portion, 111 denotes an embossed portion, 112 denotes a remaining partial peeling layer, 113 denotes a remaining cholesteric liquid crystal layer, 114 denotes a remaining partial peeling layer, 115 denotes a remaining cholesteric liquid crystal layer, 116 denotes a discrimination medium remaining on a side of a partial peeling layer, 117 denotes a discrimination medium peeled from an article, 200 denotes a discrimination medium, 201 denotes an adhesive layer, 202 denotes a partial peeling layer, 203 denotes a portion contacting a cholesteric liquid crystal layer, 204 denotes a cholesteric liquid crystal layer, 205 denotes an embossed portion, 206 denotes a substrate layer, 207 denotes a cavity, 300 denotes a discrimination medium, 301 denotes an adhesive layer, 302 denotes a multilayer film, 303 denotes a transfer foil, 304 denotes a partial peeling layer, 305 denotes a cholesteric liquid crystal layer, 306 denotes an embossed portion, 307 denotes a substrate layer, 308 denotes an area of a portion, 309 denotes an area of another portion, 310 denotes an area of a portion, 311 denotes an area of another portion, 312 denotes an area of a portion, 313 denotes a remaining partial peeling layer, 314 denotes a remaining cholesteric liquid crystal layer, 315 denotes a remaining partial peeling layer, 316 denotes a remaining cholesteric liquid crystal layer, 317 denotes a discrimination medium remaining on a side of an article, 318 denotes a discrimination medium peeled from an article, 400 denotes a discrimination medium, 401 denotes a multilayer film, 601 denotes a cholesteric liquid crystal layer, 701 denotes a light transparent film having a first refraction index, 702 denotes a light transparent film having a second refraction index, and 703 denotes a multilayer film.

BEST MODE FOR CARRYING OUT THE INVENTION

First Embodiment

Figure 1B:
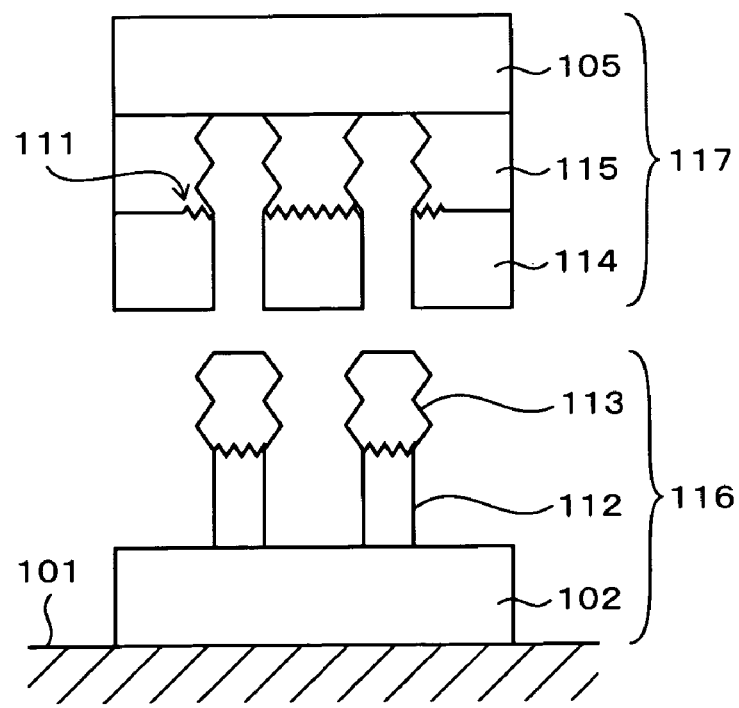

The First Embodiment is an example of a transferable breakable seal using the present invention. FIGS. 1A and 1B show cross sectional views of a discrimination medium of the First Embodiment. FIG. 1A shows a condition in which a discrimination medium 100 which functions as the breakable seal is applied to an appropriate article 101, for example, a goods package. The discrimination medium 100 has an adhesive layer 102, a partial peeling layer 103, a cholesteric liquid crystal layer 104, and a substrate layer 105 which are laminated.

Figure 5:
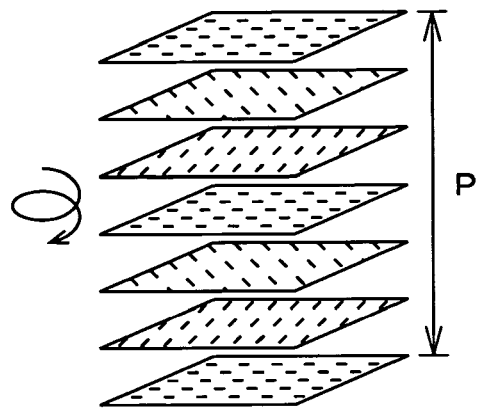
FIG. 5 is a conceptual diagram showing a structure of a cholesteric liquid crystal layer.
Figure 6:
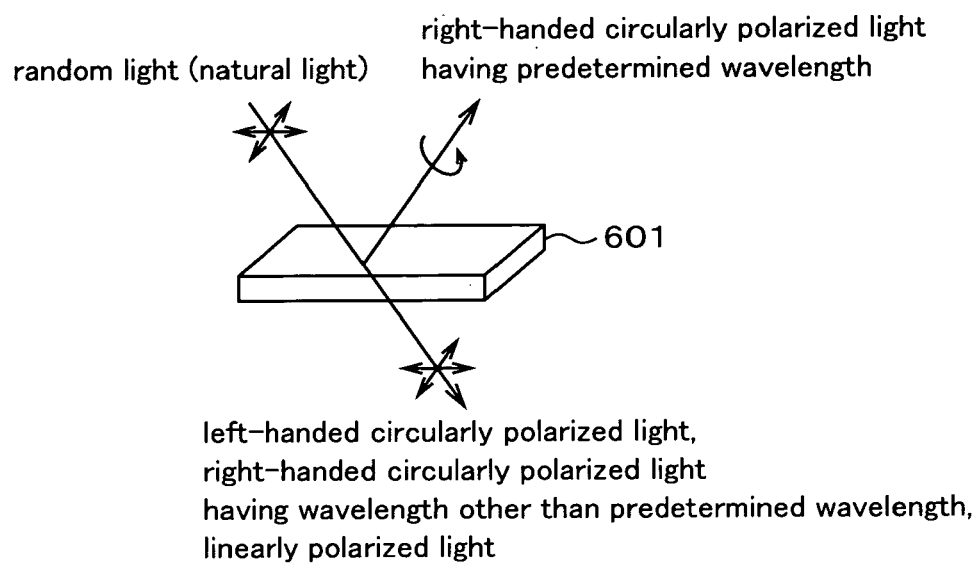
FIG. 6 is a conceptual diagram showing optical characteristics of a cholesteric liquid crystal layer.
Figure 7:
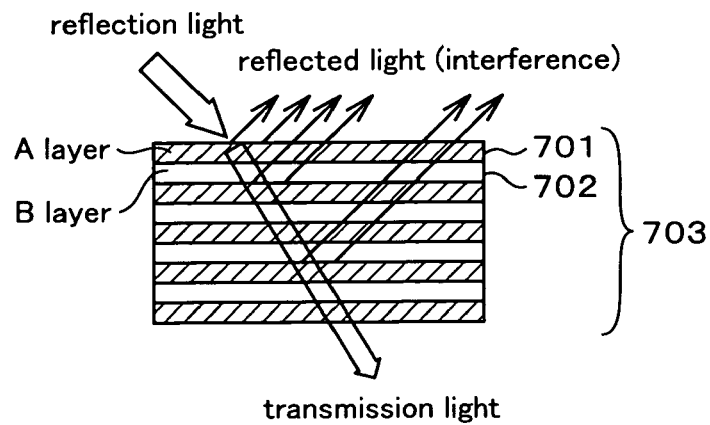
FIG. 7 is a conceptual diagram showing optical characteristics of a multilayer film.

The adhesive layer 102 is composed of a material having adhesion for applying the breakable seal 100 to the article 101. The adhesion layer 102 includes a dark (for example, black) pigment, and functions as a light absorption layer. The partial peeling layer 103 is composed of an ink including a material selected from the group consisting of a silicone, a fluorine compound, and wax or the like. The cholesteric liquid crystal layer 104 has a structure as shown in FIG. 5 and optical characteristics as shown in FIG. 6. In the cholesteric liquid crystal layer 104, a hologram having a figure is formed by an embossed portion 111. The substrate layer 105 is composed of an isotropic triacetylcellulose (=TAC).

Regarding the respective layers, the adhesive layer 102 has a thickness of about 5 to 100 μm, the partial peeling layer 103 has a thickness of about 0.2 to 5 μm. For example, the cholesteric liquid crystal layer 104 has a thickness of 1 μm. For example, the substrate layer 105 has a thickness of 40 μm.

The respective layers are fixed to each other by an adhesive, transferring, or the like. The discrimination medium 100 has an adhesion strength $X_A$ between the adhesive layer 102 and the partial peeling layer 103, an adhesion strength $X_B$ between the partial peeling layer 103 and the cholesteric liquid crystal layer 104, and an adhesion strength $X_C$ between the cholesteric liquid crystal layer 104 and the substrate layer 105.

The relationships $X_A<X_B$ and $X_A<X_C$ are satisfied at areas 106, 108, and 110. The relationships $X_C<X_A$ and $X_C<X_B$ are satisfied at areas 107 and 109. The adhesive layer 102 has an adhesion strength with respect to the article 101, and the adhesion strength is stronger than that of the adhesion strengths $X_A$, $X_B$, and $X_C$.

In the condition as shown in FIG. 1A, when the discrimination medium 100 is peeled from the article 101, peeling occurs at the interface between the adhesion layer 102 and the partial peeling layer 103 at the areas 106, 108, and 110 at the beginning since $X_A$ is smaller than $X_B$ and $X_C$ thereat. On the other hand, peeling occurs at the interface between the substrate layer 105 and the cholesteric liquid crystal layer 104 at the areas 104 and 105 at the beginning since $X_C$ is smaller than $X_A$ and $X_B$ thereat.

As a result, as shown in FIG. 1B, a portion 112 of the partial peeling layer 103 and a portion 113 of the cholesteric liquid crystal layer 104 are adhered and remain on the adhesive layer 102, and another portion 115 of the cholesteric liquid crystal layer 104 and another portion 114 of the partial peeling layer 103 are adhered and remain on the substrate layer 105.

In the condition in which the discrimination medium 100 is applied to the article 101 as shown in FIG. 1A, the sealing and the authenticity of the article 101 can be discriminated by the optical characteristics exhibited by the cholesteric liquid crystal layer 104. When the discrimination medium 100 is forcibly peeled from the article 101, as shown in FIG. 1B, the cholesteric liquid crystal layer 104 is partially torn and broken, so that the discrimination medium 100 is separated into a discrimination medium 116 remaining on the article 101 and a discrimination medium 117 peeled from the article 101.

When the discrimination medium 116 adhered and remaining on the article 101 is viewed, the cholesteric liquid crystal layer 113 is seen to have a shape corresponding to forms of the areas 107 and 109. The cholesteric liquid crystal layer 113 is different from the case shown in FIG. 1A in visibility. In particular, when the figure of the hologram is cut, the difference of the figure can be discriminated between the case shown in FIG. 1A and the case shown in FIG. 1B. The peeling of the discrimination medium 100 can be discriminated by the difference in visibility.

On the other hand, when the discrimination medium 117 peeled from the article 101 is viewed, the discrimination medium 117 and an unapplied discrimination medium 100 are different from each other in visibility since there are portions at the areas 107 and 109 at which the cholesteric liquid crystal layer does not exist. Therefore, the discrimination medium can be recognized as a used breakable seal.

For example, the figure of the portion which has the cholesteric liquid crystal layer or the figure of the portion which does not have the cholesteric liquid crystal layer is the word "UNSEALED". In this case, when the discrimination medium 116 adhered and remaining on the article 101 or the discrimination medium 117 peeled from the article 101 is viewed, the unsealing of the discrimination medium 100 can be easily discriminated. The word appears based on the unique optical characteristics exhibited by the cholesteric liquid crystal layer, and a counterfeit breakable seal having the same unique optical characteristics as the discrimination medium 100 is difficult to obtain by falsification.

One example of a production method of the First Embodiment will be explained hereinafter. First, a production method for the cholesteric liquid crystal layer will be explained hereinafter. For example, a low molecular cholesteric liquid crystal is dissolved and held in a polymerized monomer, so that cholesteric liquid crystals grow. After that, the low molecular liquid crystals are joined by photoreaction or thermal reaction, so that the molecular orientation thereof is fixed, and the low molecular liquid crystal is formed into a polymer thereof As a result, raw liquid of cholesteric liquid crystal is obtained. The raw liquid is applied to a surface of the substrate layer 105 to have a predetermined thickness. The raw liquid is oriented in a cholesteric orientation, and molecular orientation thereof is fixed. In this case, for example, the cholesteric liquid crystal has a uniform torsion pitch P extending in a molecular layered direction thereof, and has a layered thickness of 2 μm. The cholesteric liquid crystal layer appropriately has a thickness of about 0.5 to 5.0 μm. Next, the embossed portion 111 is formed on the cholesteric liquid crystal layer by embossing, so that the hologram is formed. In the above manner, the cholesteric liquid crystal layer 104 having the hologram formed thereon is supported by the substrate layer 105, and is formed.

Regarding another method for obtaining raw liquid of cholesteric liquid crystal, polymer thermotropic polymer liquid crystal of branched-chain type or straight-chain type may be heated above the liquid crystal transition point thereof, so that a cholesteric liquid crystal structure thereof grows, and may be then cooled to a temperature below the liquid crystal transition point, so that the molecular orientation thereof is fixed. Alternatively, polymer lyotropic liquid crystal of the branched-chain type or straight-chain type may be oriented in a cholesteric orientation in a solvent, and the solvent may be gradually evaporated, so that molecular orientation thereof is fixed.

Regarding raw materials of the above materials, a branched-chain type polymer having a liquid crystal forming group in a branched-chain, for example, polyacrylate, polymethacrylate, polysiloxane, or polymalonate may be used. Alternatively, a straight-chain type polymer having a liquid crystal forming group in a straight chain, for example, polyester, polyester amide, polycarbonate, polyamide, or polyimide, may be used.

Second Embodiment

The Second Embodiment differs from the First Embodiment in that peeling easily occurs in a portion of the layered structure of the cholesteric liquid crystal layer 104. In this case, when the discrimination medium 100 is peeled from the article 101, the layered structure of the cholesteric liquid crystal layer 104 is broken and peeled, so that the optical characteristics shown in FIGS. 5 and 6 cannot be obtained. As a result, the cholesteric liquid crystal layer 104 is different between before peeling and after peeling in visibility, so that the discrimination medium 100 can be easily discriminated as a broken seal. Since the cholesteric liquid crystal layer has the layered structure as shown in FIG. 5, temperature conditions, etc., are controlled during growth of the cholesteric liquid crystal layer, and a structural weak portion in the cholesteric liquid crystal layer is formed, so that interlayer peeling can easily occur at the structural weak portion.

Third Embodiment

Figure 2A:
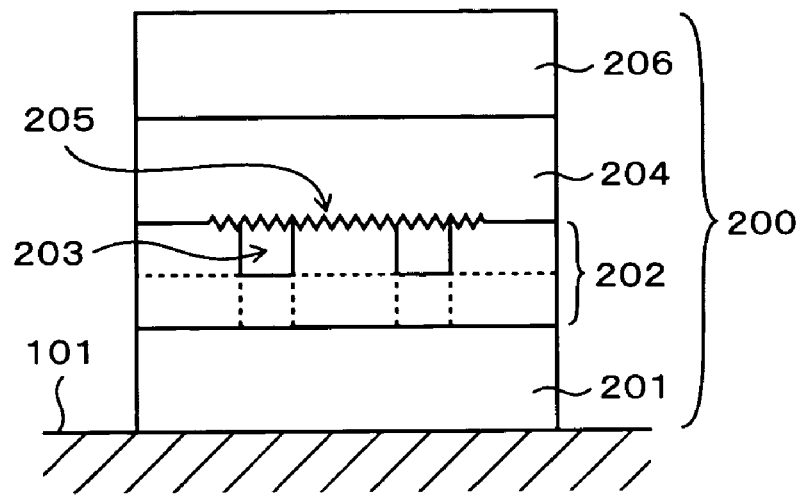
FIGS. 2A and 2B are cross sectional views showing a discrimination medium in cross section.
Figure 2B:
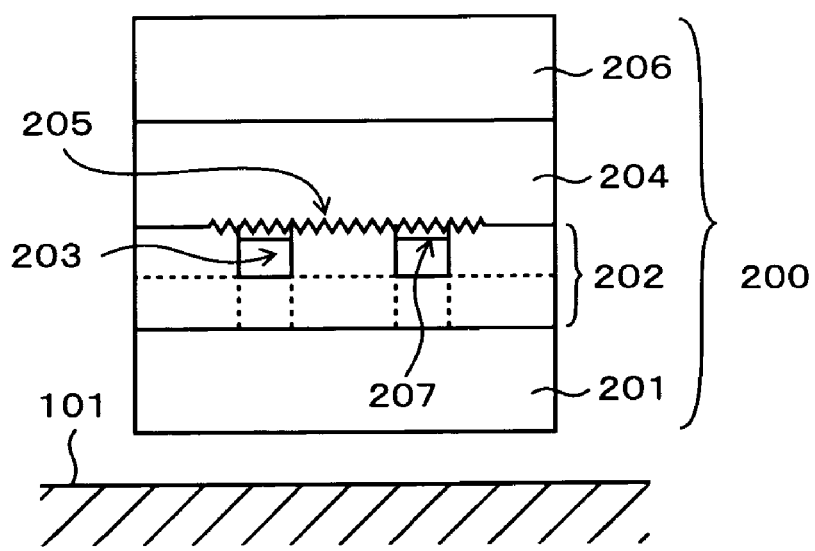

The Third Embodiment is one example of a nontransferable breakable seal using the present invention. FIGS. 2A and 2B are cross sectional views showing a structure of the Third Embodiment in a cross section. FIG. 2A shows a condition in which a breakable seal is applied to an appropriate article, and FIG. 2B shows a condition in which the breakable seal is peeled therefrom.

In the Third Embodiment, a discrimination medium 200 has an adhesive layer 201, a partial peeling layer 202, a cholesteric liquid crystal layer 204, and a substrate layer 206 which are laminated. The adhesion layer 201 includes a dark (for example, black) pigment, and functions as a light absorption layer. The partial peeling layer 202 has a portion 203 which contacts the cholesteric liquid crystal layer 204. The portion 203 has an adhesion strength with respect to the cholesteric liquid crystal layer 204, the adhesion strength being weaker than that of another portion of the partial peeling layer 20. An embossed portion 205 forming a hologram is formed on the cholesteric liquid crystal layer 204 by embossing.

When the discrimination medium 200 is peeled from the article 101, a deformation pressure is generated therein, so that the portion 203 is peeled from the cholesteric liquid crystal layer 204 or the portion 203 is shifted from the cholesteric liquid crystal layer 204. As a result, a cavity (or a gap) 207 is formed between the portion 203 and the cholesteric liquid crystal layer 204. A figure formed by the cavity 207 appears by optical characteristics of the cholesteric liquid crystal layer 204, and is recognized. Therefore, it can be discriminated whether or not the nontransferable discrimination medium 200 has been peeled from the article 101 from the condition in which the discrimination medium 200 is applied to the article 101.

Fourth Embodiment

Figure 3A:
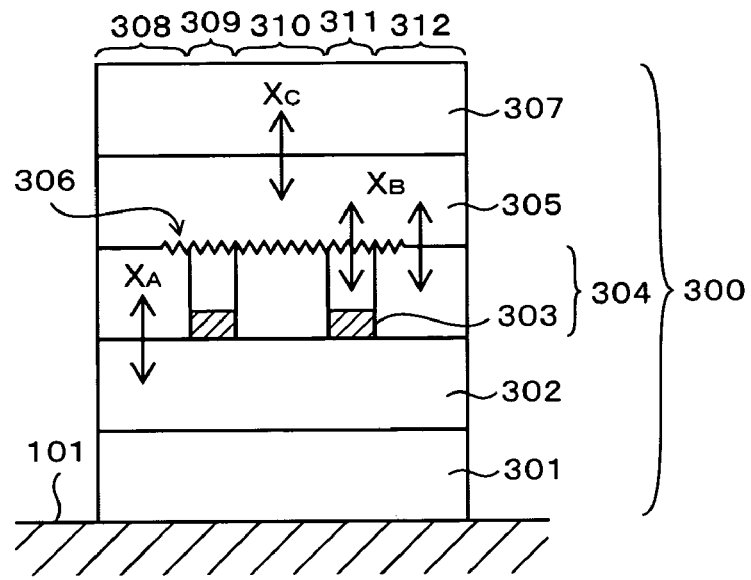
FIGS. 3A and 3B are cross sectional views showing a discrimination medium in cross section.
Figure 3B:
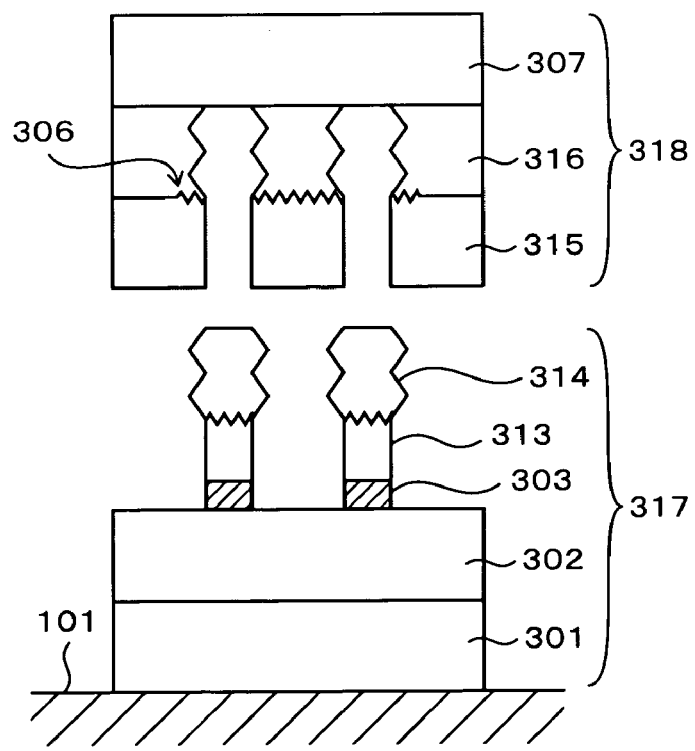

The Fourth Embodiment is another example of a transferable breakable seal using the present invention. FIGS. 3A and 3B are cross sectional views showing a structure of the Fourth Embodiment in a cross section. FIG. 3A shows a condition in which a breakable seal is applied to an appropriate article, and FIG. 3B shows a condition in which the breakable seal is peeled therefrom.

In the Fourth Embodiment, a discrimination medium 300 has an adhesive layer 301, a multilayer film 302, a partial peeling layer 304, a cholesteric liquid crystal layer 305, and a substrate layer 307 which are laminated.

The adhesion layer 301 includes a dark (for example, black) pigment, and functions as a light absorption layer. The multilayer film 302 has two light transparent films which are different from each other in diffraction index and are alternately laminated. One example of a production method for the multilayer film 302 will be explained hereinafter. First, 101 layers (A layers) are composed of polyethylene-2,6-naphthalate and 100 layers (B layers) are composed of polyethylene terephthalate including 12 mol % of isophthalic acid copolymerized therewith. The 101 layers (A layers) and the 100 layers (B layers) are laminated alternately, so that an unstretched sheet having 201 layers is produced. The sheet is stretched at a temperature of 140 degrees C. so as to be 3.5 times as long as the initial sheet in a longitudinal direction, and the sheet is stretched at a temperature of 150 degrees C. so as to be 5.7 times as long as the initial sheet in a lateral direction. Next, the sheet is subjected to heating at a temperature of 210 degrees C., and a laminated structure having a thickness of 20 μm is obtained. In the above manner, the multilayer film 302 is obtained.

The partial peeling layer 304 has a portion which is fixed to the multilayer film 302 by a transfer foil 303. The position of the transfer foil 303 corresponds to areas 309 and 311. The respective layers are fixed to each other at portions other than the transfer foil 303 by an adhesive. An embossed portion 306 forming a hologram is formed on the cholesteric liquid crystal layer 305 by embossing.

The discrimination medium 300 has an adhesion strength $X_A$ between the multilayer film 302 the partial peeling layer 304, an adhesion strength $X_B$ between the partial peeling layer 304 and the cholesteric liquid crystal layer 305, and an adhesion strength $X_C$ between the cholesteric liquid crystal layer 305 and the substrate layer 307.

The relationships $X_A<X_B$ and $X_A<X_C$ are satisfied at areas 308, 310, and 312. The relationships $X_C<X_A$ and $X_C<X_B$ are satisfied at areas 309 and 311.

When the discrimination medium 300 is peeled from the article 101, peeling occurs at the interface between the multilayer layer 302 and the partial peeling layer 304 at the areas 308, 310, and 312 at the beginning since $X_A$ is smaller than $X_B$ and $X_C$ thereat. On the other hand, peeling occurs at the interface between the substrate layer 307 and the cholesteric liquid crystal layer 305 at the areas 309 and 311 at the beginning since $X_C$ is smaller than $X_A$ and $X_B$ thereat.

As a result, as shown in FIG. 3B, a portion 317 of the discrimination medium 300 including the multilayer film 302, the transfer foil 303, a portion 313 of the partial peeling layer 304, and a portion 314 of the cholesteric liquid crystal layer 305 remains on the article 101. On the other hand, another portion 318 of the discrimination medium 300 including a portion 315 of the partial peeling layer 304, a portion 316 of the cholesteric liquid crystal layer 305, and the substrate layer 307 is obtained as a peeled portion.

In the condition in which the discrimination medium 300 is applied to the article 101 as shown in FIG. 3A, when the discrimination medium 300 is viewed, synergistic optical characteristics of reflection lights reflected by the cholesteric liquid crystal layer 305 and the multilayer film 302 can be obtained. The sealing and the authenticity of the discrimination medium 300 can be discriminated by using the above optical characteristics.

On the other hand, as shown in FIG. 3B, the condition in which the discrimination 300 is separated into the portions 317 and 318 is different from the condition as shown in FIG. 3A in visibility. It can be determined whether or not the discrimination medium 300 is broken by the above difference.

Next, an optical function obtained by the combination of the multilayer film and the cholesteric liquid crystal layer will be explained with reference to one example shown in FIG. 3A. For example, a case is considered in which the discrimination medium 300 is viewed under white light at a predetermined viewing angle. In this case, the cholesteric liquid crystal layer 305 selectively reflects right-handed circularly polarized red light. The multilayer film 302 selectively reflects red light as interference light.

When the discrimination medium 300 is directly viewed at the above viewing angle, reflection lights reflected by the cholesteric liquid crystal layer 305 and the multilayer film 302 can be seen, so that red reflection light can be strongly seen. In this case, since the amount of light increases, the change of the color can be easily seen when the viewing angle is changed.

When the discrimination medium 300 is viewed via an optical filter allowing only right-handed circularly polarized light to selectively pass therethrough, reflection light reflected by the multilayer film 302 is blocked by the optical filter. Therefore, the amount of light is smaller that of the case in which the optical filter is not used.

When the discrimination medium 300 is viewed via an optical filter allowing only left-handed circularly polarized light to selectively pass therethrough, reflection light reflected by the cholesteric liquid crystal layer 305 is blocked by the optical filter, and only left-handed circularly polarized light included in reflection light reflected by the multilayer film 302 passes through the optical filter. Therefore, the amount of light is smaller than that of the case in which the optical filter is not used. In this case, the figure of the hologram formed on the cholesteric liquid crystal layer 314 is difficult to see.

For example, a case is considered in which the discrimination medium 300 is viewed under white light at a predetermined viewing angle. In this case, the cholesteric liquid crystal layer 305 selectively reflects right-handed circularly polarized red light. The multilayer film 302 selectively reflects blue light.

When the discrimination medium 300 is directly viewed at the above viewing angle, reflection lights reflected by the cholesteric liquid crystal layer 305 and the multilayer film 302 can be seen, so that the color thereof can be seen as the mixed color of red and blue. In this case, since the amount of light increases, the change of the color can be easily seen when the viewing angle is changed.

When the discrimination medium 300 is viewed via an optical filter allowing only right-handed circularly polarized light to selectively pass therethrough, reflection light reflected by the multilayer film 302 is blocked by the optical filter. Therefore, the blue light is blocked, and the red light is seen.

When the discrimination medium 300 is viewed via an optical filter allowing only left-handed circularly polarized light to selectively pass therethrough, reflection light reflected by the cholesteric liquid crystal layer 305 is blocked by the optical filter. Therefore, the red light is blocked, and only left-handed circularly polarized light included in reflection light reflected by the multilayer film 302 passes through the optical filter, so that the blue light can be seen.

In the above manner, unique optical characteristics can be obtained by using the combination of the cholesteric liquid crystal layer and the multilayer film.

Fifth Embodiment

Figure 4A:
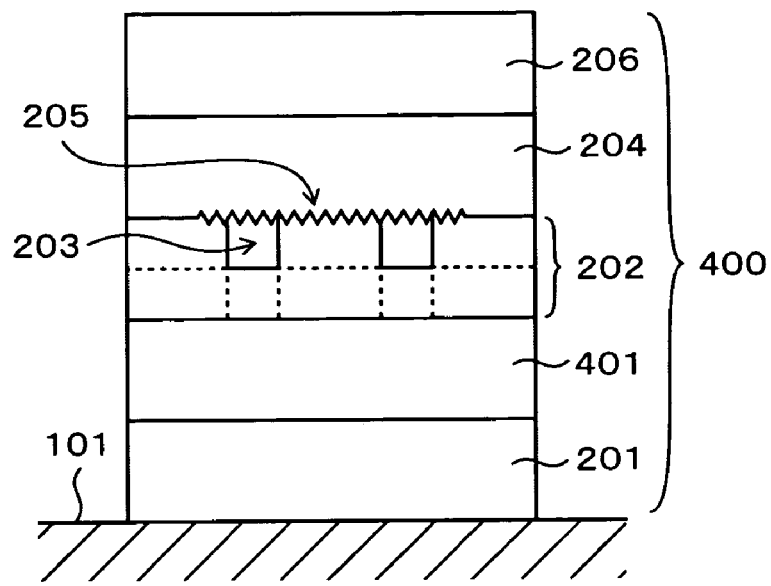
FIGS. 4A and 4B are cross sectional views showing a discrimination medium in cross section.
Figure 4B:
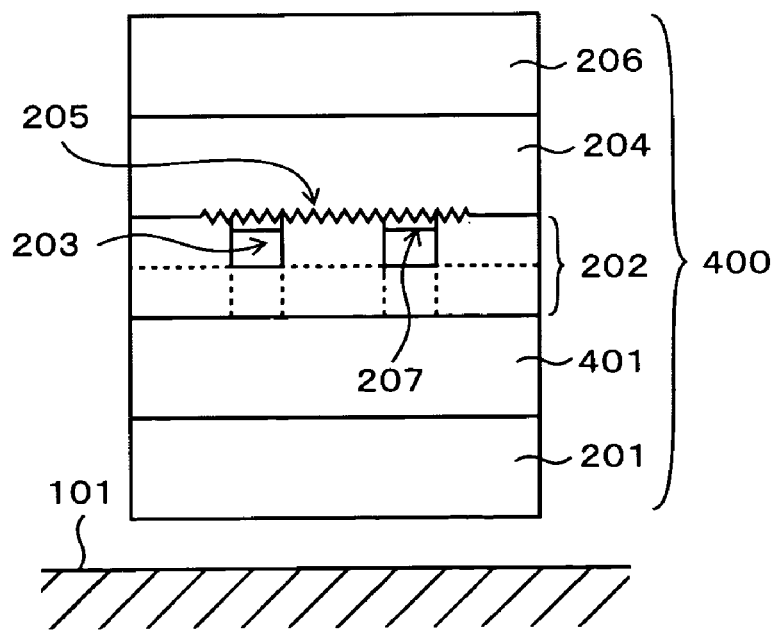

The Fifth Embodiment is one example of a nontransferable breakable seal using the present invention. FIGS. 4A and 4B are cross sectional views showing a structure of the Fifth Embodiment in cross section. FIG. 4A shows a condition in which a breakable seal is applied to an appropriate article, and FIG. 4B shows a condition in which the breakable seal is peeled therefrom.

A discrimination medium 400 of the Fifth Embodiment is different from the Third Embodiment (shown in FIGS. 2A and 2B) in that a multilayer film 401 is provided. In the Fifth Embodiment, the discrimination medium 400 is peeled from the article 101, a deformation pressure is generated therein, so that the portion 203 is peeled from the cholesteric liquid crystal layer 204 or the portion 203 is shifted from the cholesteric liquid crystal layer 204. As a result, the cavity 207 is formed between the portion 203 and the cholesteric liquid crystal layer 204. A figure formed by the cavity 207 appears by optical characteristics exhibited by the cholesteric liquid crystal layer 204 and the multilayer film 401, and is recognized. Therefore, it can be discriminated whether or not the nontransferable discrimination medium 400 has been peeled from the article 101 from the condition in which the discrimination medium 400 is applied to the article 101.

Another Embodiment

In the above Embodiment, a multilayer film having plural light transparent films which are different from each other in diffraction index and are laminated may be used instead of the cholesteric liquid crystal layer. An optical functional layer having a cholesteric liquid crystal layer and a multilayer film having plural light transparent films which are different from each other in diffraction index and are laminated may be used. In this case, the authenticity and the unsealing of the discrimination medium can be discriminated by using unique optical characteristics exhibited by the cholesteric liquid crystal layer and the multilayer film.

A pattern may be formed on a portion of the adhesive layer as the partial peeling layer by printing so as to weaken the adhesion strength of the adhesive layer at the portion. In this feature, the function of the partial peeling layer can be provided to a surface layer of the adhesive layer. That is, a surface layer of the adhesive layer proximate to the cholesteric liquid crystal layer or a surface layer of the adhesive layer proximate to the multilayer film may be a partial peeling layer. In this feature, the partial peeling layer is integrally formed at a surface of the adhesive layer.

INDUSTRIAL APPLICABILITY

The discrimination medium of the present invention can be applied to a breakable seal, by which it can be determined whether or not the seal has been broken. The discrimination medium of the present invention can be applied to a breakable seal which can discriminate the authenticity thereof.

The invention claimed is:

1. A discrimination medium comprising:
an optical functional layer including at least one of a cholesteric liquid crystal layer having a circular polarization light selectivity of reflecting predetermined circularly polarized light, and a multilayer film having plural light transparent films which are laminated and are different from each other in refraction index;
an adhesive layer;
a partial peeling layer having a first surface and a second surface, the first surface directly or indirectly contacting the adhesive layer, the second surface directly or indirectly contacting the optical functional layer; and
a structure which is provided at a portion of the second surface and of which the portion is easily peeled from the optical functional layer.

2. A discrimination medium comprising:
an optical functional layer including at least one of a cholesteric liquid crystal layer having a circular polarization light selectivity of reflecting predetermined circularly polarized light, and a multilayer film having plural light transparent films which are laminated and are different from each other in refraction index;
a substrate layer provided on the optical functional layer;
an adhesive layer;
a partial peeling layer having a first surface and a second surface, the first surface directly or indirectly contacting the adhesive layer, the second surface directly or indirectly contacting the optical functional layer;
an adhesion strength $X_A$ on the first surface of the partial peeling layer;
an adhesion strength $X_B$ on the second surface of the partial peeling layer; and an adhesion strength $X_C$ between the optical functional layer and the substrate layer, wherein
the adhesion strength $X_A$, the adhesion strength $X_B$, and the adhesion strength $X_C$ satisfy the relationships $X_A<X_B$ and $X_A<X_C$ at a portion, and satisfy the relationships $X_C<X_A$ and $X_C<X_B$ at another portion.

3. A discrimination medium comprising:
an optical functional layer including at least one of a cholesteric liquid crystal layer having a circular polarization light selectivity of reflecting predetermined circularly polarized light, and a multilayer film having plural light transparent films which are laminated and are different from each other in refraction index;
an adhesive layer;
a partial peeling layer having a first surface and a second surface, the first surface directly or indirectly adhering the adhesive layer, the second surface directly or indirectly contacting the optical functional layer; and
a portion which is provided on the second surface of the peeling layer and which has an adhesion strength weaker than that of another portion of the peeling layer, wherein
when a pressure or a stress is applied to the discrimination medium, the portion is selectively peeled, and a cavity is thereby formed thereat.

4. A discrimination medium according to claim 1, the discrimination medium further comprising:
a multilayer film provided between the adhesive layer and the partial peeling layer, the multilayer film having plural light transparent films which are laminated and are different from each other in refraction index.

5. A discrimination medium according to claim 1, the discrimination medium further comprising:
a cut line provided at at least one of the respective layers by cutting.

6. A discrimination medium according to claim 1, the discrimination medium further comprising:
a structure which is provided in the cholesteric liquid crystal layer, and in which an interlayer peeling easily occurs.

7. A discrimination medium according to claim 1, the discrimination medium further comprising:
a hologram which is provided in the optical functional layer and which has a figure.

8. A discrimination medium according to claim 7, wherein when the discrimination medium is peeled, the figure of the hologram is cut.

9. A discrimination medium according to claim 1, wherein when the discrimination medium is peeled, at least one of a portion of the optical functional layer remains in the discrimination medium and another portion of the optical functional layer is peeled from the discrimination medium, wherein the portion and another portion has a figure.

10. A discrimination medium according to claim 3, wherein
when the discrimination medium is peeled, the cavity has a figure.

11. An article to be discriminated comprising:
the discrimination medium according to claim 1.

12. A discrimination medium according to claim 2,
the discrimination medium further comprising:
a multilayer film provided between the adhesive layer and the partial peeling layer, the multilayer film having plural light transparent films which are laminated and are different from each other in refraction index.

13. A discrimination medium according to claim 2,
the discrimination medium further comprising:
a cut line is provided to at at least one of the respective layers by cutting.

14. A discrimination medium according to claim 2,
the discrimination medium further comprising:
a structure which is provided in the cholesteric liquid crystal layer, and in which an interlayer peeling easily occurs.

15. A discrimination medium according to claim 2,
the discrimination medium further comprising:
a hologram which is provided in the optical functional layer and which has a figure.

16. A discrimination medium according to claim 15, wherein
when the discrimination medium is peeled, the figure of the hologram is cut.

17. A discrimination medium according to claim 2, wherein
when the discrimination medium is peeled, at least one of a portion of the optical functional layer remains in the discrimination medium and another portion of the optical functional layer is peeled from the discrimination medium, wherein the portion and another portion has a figure.

18. An article to be discriminated comprising:
the discrimination medium according to claim 2.

19. A discrimination medium according to claim 3,
the discrimination medium further comprising:
a multilayer film provided between the adhesive layer and the partial peeling layer, the multilayer film having plural light transparent films which are laminated and are different from each other in refraction index.

20. A discrimination medium according to claim 3,
the discrimination medium further comprising:
a cut line is provided to at at least one of the respective layers by cutting.

21. A discrimination medium according to claim 3,
the discrimination medium further comprising:
a structure which is provided in the cholesteric liquid crystal layer, and in which an interlayer peeling easily occurs.

22. A discrimination medium according to claim 3,
the discrimination medium further comprising:
a hologram which is provided in the optical functional layer and which has a figure.

23. A discrimination medium according to claim 22, wherein
when the discrimination medium is peeled, the figure of the hologram is cut.

24. An article to be discriminated comprising:
the discrimination medium according to claim 3.

* * * * *